United States Patent
Simon et al.

(10) Patent No.: US 10,568,026 B2
(45) Date of Patent: Feb. 18, 2020

(54) HIGH PRIORITY NOTIFICATION SYSTEM AND METHOD

(71) Applicant: ONE MEDIA LLC, Hunt Valley, MD (US)

(72) Inventors: Michael J. Simon, Hunt Valley, MD (US); Mark Earnshaw, Hunt Valley, MD (US); Sandeep Mavuduru Kannappa, Hunt Valley, MD (US); Kevin Shelby, Hunt Valley, MD (US); Mark A. Aitken, Hunt Valley, MD (US)

(73) Assignee: One Media, LLC, Hunt Valley, MD (US)

( * ) Notice: Subject to any disclaimer, the term of this patent is extended or adjusted under 35 U.S.C. 154(b) by 446 days.

(21) Appl. No.: 15/079,345

(22) Filed: Mar. 24, 2016

(65) Prior Publication Data
US 2016/0286488 A1 Sep. 29, 2016

Related U.S. Application Data

(60) Provisional application No. 62/137,511, filed on Mar. 24, 2015.

(51) Int. Cl.
*H04W 52/02* (2009.01)
*H04W 4/06* (2009.01)
*H04W 16/14* (2009.01)

(52) U.S. Cl.
CPC ......... *H04W 52/0216* (2013.01); *H04W 4/06* (2013.01); *H04W 52/028* (2013.01); *H04W 52/0235* (2013.01); *H04W 16/14* (2013.01)

(58) Field of Classification Search
CPC ..... G06K 7/10594; H04L 40/04; H04L 47/10; H04L 47/14; H04L 47/2466;
(Continued)

(56) References Cited

U.S. PATENT DOCUMENTS 5,930,295 A * 7/1999 Isley, Jr. ............ H04B 7/18563
375/219
7,715,855 B2 * 5/2010 Subrahmanya ....... H04W 68/00
455/414.1

(Continued)

OTHER PUBLICATIONS

International Search Report and Written Opinion directed to related International Patent Application No. PCT/US2016/023914, dated Jun. 16, 2016; 15 pages.

*Primary Examiner* — Marsha D Banks Harold
*Assistant Examiner* — Dharmesh J Patel
(74) *Attorney, Agent, or Firm* — Sterne, Kessler, Goldstein & Fox P.L.L.C.

(57) ABSTRACT

An example method for notifying a battery-powered device of the presence of high priority broadcast content while enabling the device to conserve battery power includes generating a high priority broadcast signal. The signal includes a high priority symbol identifier for informing the battery powered device to switch from an idle state to an acquisition state to inspect the remainder of the high priority broadcast signal. The signal further includes a high priority indication symbol for informing the battery powered device to transition to an active state from the acquisition state to receive high priority broadcast content before returning to the idle state. The signal further includes a timing symbol for informing the battery powered device of the minimum time period until a next a high priority broadcast signal should be expected, enabling the battery powered device to remain in the idle state until the next high priority broadcast signal.

19 Claims, 14 Drawing Sheets

(58) Field of Classification Search
CPC ...... H04L 47/2433; H04L 65/80; H04W 4/06;
H04W 4/16; H04W 4/22; H04W 16/14;
H04W 28/24; H04W 52/028; H04W
52/0209; H04W 52/0235; H04W 52/0216;
H04W 52/283; H04W 52/343; H04W
68/00; H04W 68/02; H04W 72/1242;
H04W 84/12; H04W 88/08; Y02B 60/50
See application file for complete search history.

(56) References Cited

U.S. PATENT DOCUMENTS

| | | | |
|---|---|---|---|
| 2002/0136217 A1* | 9/2002 | Christensen | |
| 2003/0035424 A1* | 2/2003 | Abdollahi | H04B 7/18582 370/392 |
| 2007/0195742 A1* | 8/2007 | Erdman | H04L 47/10 370/338 |
| 2007/0242643 A1* | 10/2007 | Chandra | H04H 20/61 370/338 |
| 2008/0025250 A1* | 1/2008 | Wang | H04W 68/02 370/328 |
| 2009/0016524 A1* | 1/2009 | Park | H04W 8/26 380/44 |
| 2010/0034312 A1 | 2/2010 | Muharemovic et al. | |
| 2012/0195258 A1* | 8/2012 | Zhou | H04W 4/08 370/328 |
| 2012/0236776 A1 | 9/2012 | Zhang et al. | |
| 2014/0150014 A1 | 5/2014 | Aitken et al. | |
| 2014/0204822 A1* | 7/2014 | Park | H04W 68/025 370/311 |
| 2014/0328329 A1* | 11/2014 | Novlan | H04W 72/042 370/336 |
| 2016/0269980 A1 | 9/2016 | Simon et al. | |

\* cited by examiner

HIGH PRIORITY NOTIFICATION SYSTEM AND METHOD

CROSS-REFERENCE TO RELATED APPLICATIONS

This application claims priority from U.S. Patent Application No. 62/137,511 filed on Mar. 24, 2015, which is incorporated by reference herein in its entirety.

FIELD OF DISCLOSURE

The present disclosure relates to the field of wireless communication, and more particularly, to a mechanism for enabling high priority notifications in broadcast networks.

BACKGROUND

The broadcast spectrum is divided up into different frequencies and allocated among different broadcasters for various uses in different geographic regions. The frequencies of the spectrum are allocated based on licenses granted to the broadcasters. Based on the allocations, a broadcaster may be limited to broadcasting a specific type of content, such as a television signal, on a certain frequency within a certain geographic radius. Broadcasting outside of an allocated spectrum could be a violation for the broadcaster.

If a broadcaster wishes to transmit another type of content within that geographic radius, the broadcaster may be required to obtain an additional spectrum license and in turn be allocated an additional frequency within that frequency. Similarly, if a broadcaster wishes to transmit content within another geographic radius, the broadcaster may be required to obtain an additional spectrum license for that region. Obtaining, additional spectrum licenses, however, may be difficult, time consuming, expensive, and impractical.

In addition, a broadcaster may not always fully utilize an entire portion of spectrum for which it has been granted a license. This may create inefficiencies in the utilization of the broadcast spectrum.

Moreover, the anticipated use of the broadcast spectrum may be changing. For example, current broadcast television solutions are monolithic and designed for a primary singular service. However, broadcasters may anticipate providing multiple wireless-based types of content, in addition to broadcast television in the future, including mobile broadcasting and IoT services. In particular, there are many scenarios where a large number of devices may all wish to receive identical data from a common source beyond broadcast television. One such example is mobile communication services, where a large number of mobile communication devices in various geographic locations may all need to receive a common broadcast signal conveying the same content, such as a software update or an emergency alert, for example. In such scenarios, it is significantly more efficient to broadcast or multicast the data to such devices rather than individually signaling the same data to each device. Thus, a hybrid solution may be desirable.

To more efficiently utilize the broadcast spectrum, different types of content may be time-multiplexed together within a single RF channel. Further, different sets of transmitted content may need to be transmitted with different encoding and transmission parameters, either simultaneously, in a time division-multiplexed fashion (TDM), in a frequency division—multiplexed (FDM), layer division-multiplexed (LDM) or a combination. The amount of content to be transmitted may vary with time and/or frequency.

In addition, content with different quality levels (e.g. high definition video, standard definition video, etc.) may need to be transmitted to different groups of devices with different propagation channel characteristics and different receiving environments. In other scenarios, it may be desirable to transmit device-specific data to a particular device, and the parameters used to encode and transmit that data may depend upon the device's location and/or propagation channel conditions.

At the same time, the demand for high-speed wireless data continues to increase, and it is desirable to make the most efficient use possible of the available wireless resources (such as a certain portion of the wireless spectrum) on a potentially time-varying basis.

Furthermore, it may be desirable for a receiver to identify and distinguish high priority communications, such as an emergency communication for example, that should be given immediate or high priority attention even when a receiver is in an Idle state. A receiver may be in one of two states, for example. In an Active state, a receiver is turned on (from the end user's perspective), and is receiving, decoding, and presenting transmitted information such as a television program or movie. At the same time that an Active state receiver is decoding a regular transmission, it can easily monitor for a high priority transmission as well. In an Idle state, a receiver is turned off from the end user's perspective but is not completely powered off. An idle receiver would not be presenting transmitted information to the end user on an ongoing basis. However, an idle receiver may still need to monitor for and identify high priority communications. For example, it may be desirable for a mobile phone to receive an emergency alert notification event while the mobile phone is turned off (although not completely powered off). If a high priority communication is identified, then an Idle receiver may be expected to process the accompanying information and then present such information to the end user.

It should be appreciated that a receiver may be a battery powered mobile device such as a tablet computer or smartphone rather than a stationary device connected to an electric grid. Switching such a device from an Idle state to an Active state may consume extra battery power. Thus, in order to conserve battery power, it may be desirable for improved efficiency to maximize a receiver's time in an idle state and minimize the receiver's time in an Active state while still effectively monitoring for and identifying high priority communications with little delay.

In one example solution, an idle receiver may be configured to inspect every transmitted communication to determine whether the communication is a high priority communication. However, such a solution may not be efficient and may not effectively conserve a receiver's battery power.

SUMMARY

An example method for notifying a battery-powered device of the presence of high priority broadcast content while enabling the device to conserve battery power includes generating a high priority broadcast signal and broadcasting the high priority broadcast signal to the battery-powered device. The signal includes a high priority symbol identifier for informing the battery powered device to switch from an idle state to an acquisition state to inspect the remainder of the high priority broadcast signal. The signal further includes a high priority indication symbol for informing the battery powered device to transition to an active state from the acquisition state to receive high priority broadcast content before returning to the idle state. The signal further includes a timing symbol for informing the battery powered device of the minimum time period until a next a high priority broadcast signal should be expected, enabling the battery powered device to remain in the idle state until the next high priority broadcast signal.

An example method for consuming high priority content at a battery-powered device while conserving battery power includes the battery-powered device transitioning from an idle state to an acquisition state. The method further includes the battery-powered device receiving a high priority broadcast signal comprising a high priority identifying symbol, a high priority indication symbol, and a timing symbol. The method further includes the battery-powered device, upon successfully decoding the high priority symbol identifier, inspecting the high priority indication symbol to determine whether high priority content is present. The method further includes the battery-powered device transitioning from the acquisition state to an active state to consume the high priority content responsive to determining that high priority content is present. The method further includes the battery-powered device inspecting the timing symbol to determine the minimum time until the next expected high priority broadcast signal. The method further includes the battery-powered device returning to the idle state until the minimum time has expired.

BRIEF DESCRIPTION OF THE DRAWINGS

In the accompanying drawing's, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

A bootstrap signal designed to enable robust detection and service discovery, system synchronization, and receiver con-figuration has been previously described in U.S. patent application Ser. No. 15/065,427 and is incorporated herein by reference in its entirety. The bootstrap provides two primary functions: synchronization and the signaling to discover the waveform being emitted via low level signaling, to start decoding a waveform that follows. It is a robust waveform that provides extensibility to evolve over time. In particular, the bootstrap signal works for current broadcasting system but also allows for support of new services, including mobile broadcasting and IoT services.

Figure 1:
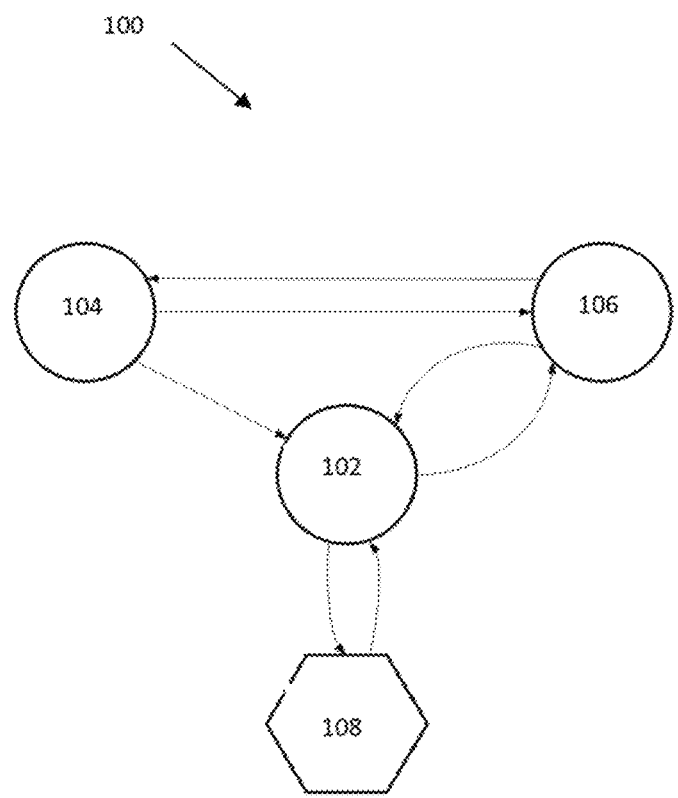
FIG. 1 illustrates an example state diagram including the potential states that a battery powered communication devices may occupy.

Described herein is an example high priority notification system, based upon the previously described bootstrap signal, to allow for battery powered communication devices to efficiently detect high priority broadcast communications while enabling the battery powered devices to maximize time spent in an Idle state and reducing the amount of resources required to be expended by the battery powered communication devices in order to identify the high priority communications, thus conserving battery power. FIG. 1 is an example state diagram 100 illustrating the potential states that a battery powered communication devices may occupy. In an Idle 102 state, a device is powered on although is in a low power consumption state, meaning that, other than some possible background activity, the device isn't continuously processing or consuming content or data. Thus, a device may conserve power while in the Idle 102 state. In an active state 104, on the other hand, the device may be continuously processing and consuming data and therefore be utilizing more power. An acquisition 106 state represents a temporary state which may be triggered by a user or a task or background application running on the device. The device only remains in the acquisition 106 temporarily while deciding whether to enter the active 104 or idle 102 state. For example, a device triggered by a user action will proceed to an Active 104 state in order to continue to process information or input from the user. A device triggered by an application running, in the background on the device, for example, may determine, based on data or content received, whether to return back to the idle 102 state or transition to the Active 104 state. A device may also be in an un-powered state 108, in which case the device is not capable of transitioning to an active state unless the power device is first powered on and transitioned to an idle 102 state.

It should be appreciated that a high priority notification, as will be described, may include a notification of an emergency or other suitable high priority events or information that may be desirable to present to a user immediately or in the relatively near future.

It should be appreciated that, battery-powered devices as referenced throughout example descriptions herein, include any mobile communication or computing device that is not directly connected to an electrical power grid and that may be under power utilization constraints. This may include, for example, solar powered devices or devices being powered by other alternative energy sources.

Figure 2:
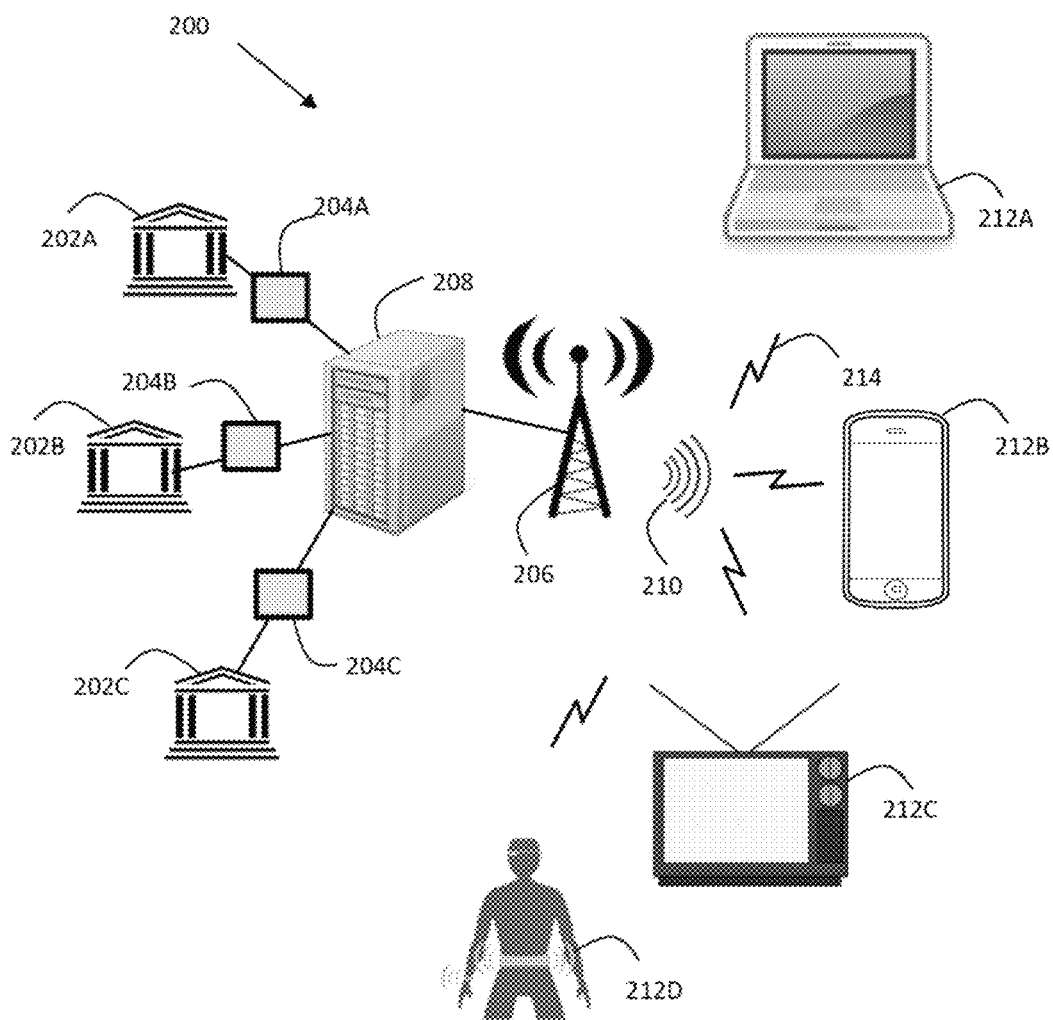
FIG. 2 illustrates an example broadcast network communication system.

FIG. 2 illustrates an example broadcast network communication system 200 within which an example high priority notification system may be based. In particular, the system 200 includes a plurality of content providers 202A, 202B, and 202C (hereinafter content provider 202 providing a variety of types of content 204A, 204B, and 204C (hereinafter content 204) via a broadcast network 206, it should be appreciated that although three content providers 202 are illustrated, system 200 may include any suitable number of content providers 202. In addition, content providers 202 may be providers of any suitable types of content, such as televisions broadcast signals, software updates, emergency alerts, and so on. It should be further appreciated that the content providers 202 may provide content 204 via either a wireless or wired connection to a gateway 208.

The content 204 is time-multiplexed, at the gateway 208, into a single RF channel 210. The broadcast receivers 212A, 212B, 212C, and 212D (hereinafter broadcast receiver 212) are configured to identify and receive the broadcast signals 214 via the RF channel 210. It should be appreciated that although four different types of broadcast receivers 212 are illustrated (a laptop computer 212A, a mobile telephone 2128, a television 212C, and a wearable 212D), system 200 may include any suitable number and type of broadcast receivers 212, including wearable and IoT devices and other suitable mobile battery-powered communication devices.

In order to help identify the content of a broadcast signal and distinguish different types of broadcasts, and for example, the priority levels of a broadcast, broadcast signals 214 include code points or identifiers. A code point may indicate whether a broadcast signal 214 includes television/video content, application data such as weather information, or an emergency alert, for example. It should be appreciated that these are just a few examples and that a code point can potentially have a broad range of applications and enables flexibility and extensibility. In particular, if a broadcast receiver 212 isn't familiar with a code point or isn't able to detect or decode the content of a broadcast signal 214 including a specific code point, the broadcast receiver 212 may simply ignore the broadcast signal 214.

A code point is defined based on certain syntax and semantics. In particular, syntax relates to the structure or format of the data bits, meaning the order in which bits are presented (e.g. signaling). Semantics, on the other hand, relates to the meaning of each section of bits. More specifically, semantics defines how a specified pattern is to be interpreted and what action is to be taken based on that interpretation. Thus, based on the defined syntax and semantics, code points may be very versatile in terms of potential applications and uses.

For example, code points may be defined as public, or private. Specifically, a public code point may be one that anyone may use to communicate broadcast signals to a broad range of broadcast receivers 212. A code point defined as private can be used for more specific and limited applications by a broadcaster for a new business model. For example, a broadcaster may deliver services to applications they have authored and distributed via a mechanism such as an app store, for example, using a private code point recognized by the software application. The software application may be pre-programmed to recognize such code points. Such applications might run in the background on a receiving device or broadcast receiver 212 and periodically check for new data via such a mechanism in the broadcast channel in order to conserve the receiver's 212 battery power. This private mode can be referred to as Discontinuous Reception, or DRX, for example and may be incorporated in a next generation broadcast system as previously described in U.S. patent application Ser. No. 14/092,993.

In addition to being designated as public or private, code points may be used either in combination with or without a following associated waveform or data depending on signaling. Such versatility enables the code points to be used in a variety of ways, as will be described in more detail, including, for example: for communicating emergency alerts; for sending application data and updates and for communicating hyper local targeted content, for communicating geo-location and transmitter identification, which can either be implemented with or without associated post signal waveforms or data which can be public or private in nature as will be described by some examples.

Figure 3:
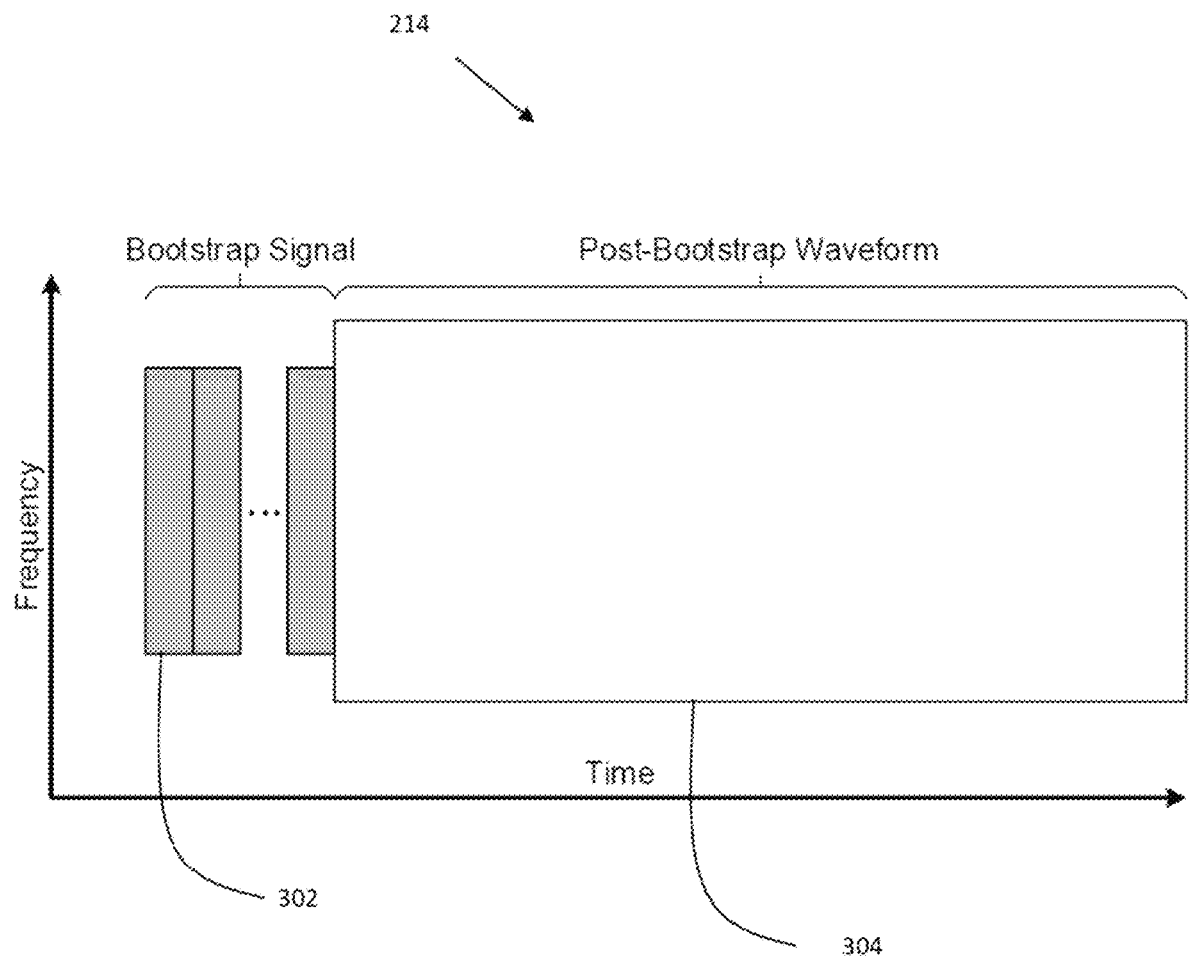
FIG. 3 illustrates an example broadcast symbol.

In one example implementation including one particular type of syntax, a bootstrap 302, as illustrated in FIG. 3, precedes a post-bootstrap waveform 304 and is designed to indicate, at a low level, the type or form of a signal 214 that is being transmitted during a particular time period, so that the broadcast receiver 212 can discover and identify if the post-bootstrap waveform 304 is present, which in turn indicates how to receive the services that are available via that post-bootstrap waveform 304. Thus, the bootstrap is relied on as as an integral part of every transmit frame to allow for sync/detection and system configuration. It should be appreciated, however, that a post-bootstrap waveform 304 may not necessarily be present in all implementations. The bootstrap design includes a flexible signaling approach to convey frame configuration and content control information to the broadcast receiver 212. The signal design describes the mechanism by which signal parameters are modulated on the physical medium. The signaling protocol describes the specific encoding used to communicate parameter selections governing the transmit frame configuration. This enables reliable service discovery while providing extensibility to accommodate evolving signaling needs from a common frame structure. Specifically, the design of the bootstrap enables universal signal discovery independent of channel bandwidth, as previously described in U.S. patent application Ser. No. 15/065,427 incorporated herein by reference in its entirety.

The bootstrap also enables reliable detection in the presence of a variety of channel impairments such as time dispersion and multipath fading, Doppler shift, and carrier frequency offset. In addition, multiple service contexts are accessible based on mode detection during signal discovery enabling broad flexibility in system configuration. The bootstrap also facilitates extensibility to accommodate ongoing evolution in service capability based on a hierarchical signaling structure. Thus, new signal types not yet conceived could be provided by a content provider 202 and identified within a transmitted signal 214 through the use of a bootstrap signal.

A more detailed description of a bootstrap and the associated structure as well how a bootstrap is constructed and signaled has been previously described in U.S. patent application Ser. No. 15/065,427, incorporated herein by reference in its entirety.

Figure 4:
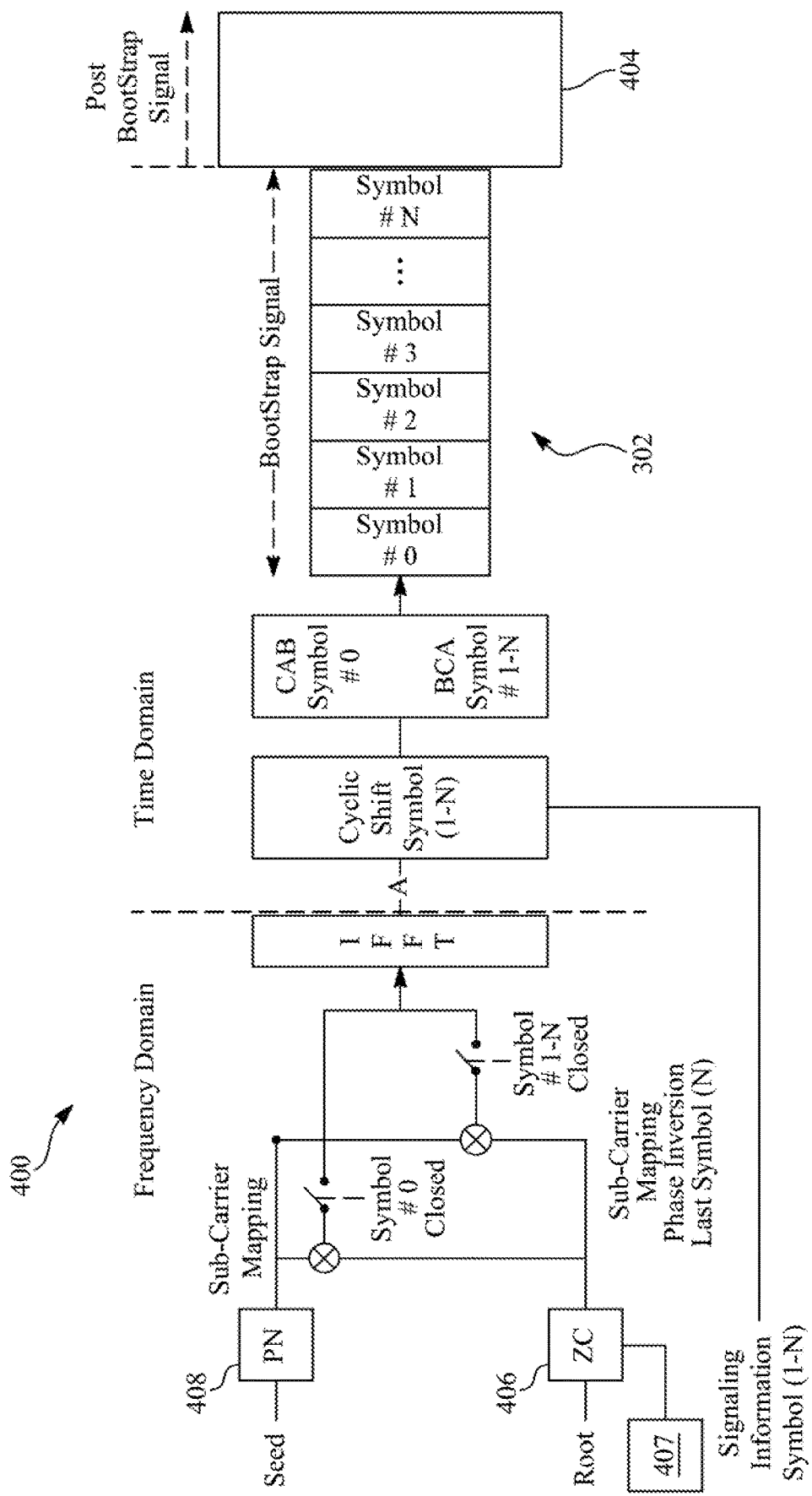
FIG. 4 illustrates an example system for generating a bootstrap.

FIG. 4 illustrates an example system 400 for generating a bootstrap 302. The bootstrap signal 302 generated by the system 400 consists of (N) OFDM symbols labeled (0-N). The post bootstrap signal 404 represents service being signaled by bootstrap and consumed by a receiver. As previously described, the bootstrap signal is generated by a Zadoff-Chu (hereinafter referred to as "ZC") module or sequence generator 406 generating a ZC sequence using a root value, a pseudo noise (PN) module or sequence generator 408 generating a PN sequence based on a seed value, and then modulating the ZC sequence with the PN sequence before translating the resulting complex sequence to a time domain and applying a cyclic shift on symbols for signaling. A conjugate signaling mechanism 407 enables additional signaling information by introducing the conjugate of the ZC root.

It should be appreciated that a ZC length ($N_{zc}$) is a prime number. In particular, the ZC root (a Zadoff-Chu sequence with No cyclic shift) can have $N_{zc}$-1 possible values. For example, if $N_{zc}$ is selected to be prime number 1499, the number of possible root values is 1498. A seed value can have one of 65,535 possible value, based on the PN module 408 initialization vector of 16-bit linear feedback shift register. Thus, the potential number of combinations of root and seed values, given a single ZC length, is N(ZC)×Root (q)×PN Seed=1×1498×65,535=approximately 98,171,430 possible combinations. It should be appreciated that as the number of possible $N_{zc}$ is increased, the total possible combinations increases to an even greater potential total. For example, if $N_{zc}$ can be one of 9 different possible prime numbers, including 1483, 1487, 1489, 1493, 1499, 1511, 1523, 1531, and 1543, the total number of potential combinations of N(ZC)×Root (q)×PN Seed would be approximately 883 million. Such combinations are referred to herein as code points.

It should be appreciated that each code point uniquely identifies a bootstrap symbol and therefore the purpose of the symbol. Thus, based on the defined syntax and semantics, code points may be very versatile in terms of potential applications and uses. For example, several code points may be assigned in groups or singularly, depending on the intended use. Code points may therefore be a potentially valuable and underutilized resource.

As one example use of these under-utilized assets, code points can be defined to be indicative of high priority communications, and used as a wakeup flag according to one example syntax. For example, code points can be defined by certain standards to be indicative of an emergency alert notification or other high priority notifications.

It should be appreciated that other battery-powered devices, such as IoT devices, may similarly be configured to periodically check for code points in the broadcast stream and receive high priority communications while otherwise remaining, in a low-power Idle state. It should further be appreciated that devices may only be configured to detect and decode certain code points and simply ignore a code point that is not understood. This facilitates further extensibility of code points as well as a wide variety of uses of code points for high priority communications.

In order to facilitate high priority broadcast communications, a signal 214 incorporates a notification mechanism indicative of the presence of high priority information. A broadcast receiver 212 may then identify and decode the high priority information and present such information to a user. For example, the presence of high priority information may be indicated by the presence of a code point, or a high priority indication or a flag, according to one example syntax) in the bootstrap 302. A broadcast receiver 212 that identifies the indication may switch from an Idle state to an Active state in order to receive the high priority information and then return to the Idle state. Alternatively, if no high priority indication is identified, the broadcast receiver 212 may remain in the Idle state.

Figure 5:
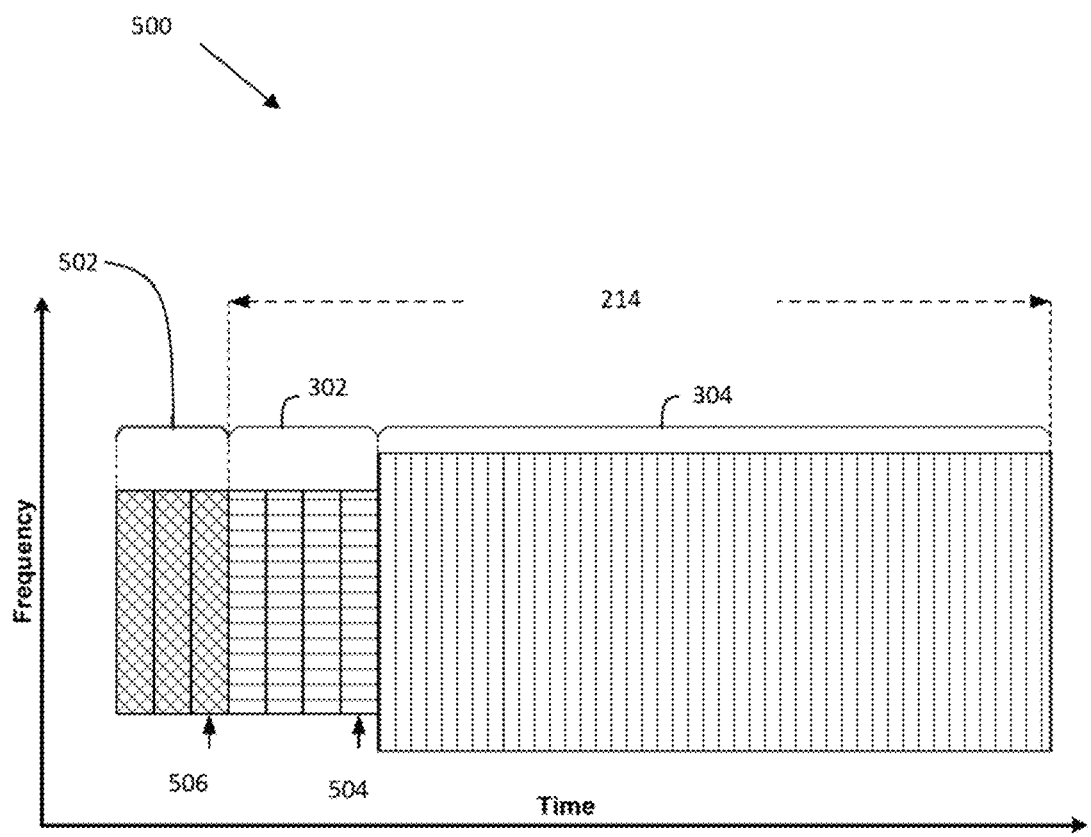
FIG. 5 illustrates an example implementation of a high priority signal.

FIG. 5 illustrates one example implementation of a high priority signal 500 to enable a battery-powered device to efficiently detect high priority broadcast communications while enabling the battery powered devices to maximize time spent in an Idle state. The high priority signal 500 includes a normal signal 214 as described earlier, including a bootstrap 302 and a post-bootstrap waveform 304. In addition, the high priority signal 500 includes a high priority bootstrap symbol/s ("hereinafter referred to as "HPBS") 502 that precedes the bootstrap 302. In one example, use of a bootstrap mechanism as may be referenced herein is the example bootstrap implementation and syntax and semantics is an ATSC 3.0 implementation. It should be appreciated that this is one of the first standards to adopt the general bootstrap mechanism for synchronization and discovery, as described in U.S. patent application Ser. No. 15/065,427. It should be appreciated the concept of a HPBS isn't included in the current ATSC 3.0 standard. However, this could be synergistic in the future and any reference in this example to HPBS is hypothetical herein.

The HPBS 502 includes a wakeup flag symbol that enables the broadcast receiver 212 to detect and identify the high priority signal 500 as well as to synchronize with the high priority signal 500. A broadcast receiver 212 can monitor for this flag in order to determine whether a HPBS is being communicated. If the HPBS 502 such a wakeup flag (an example syntax) is detected as true, the broadcast receiver 212 in an Idle state can fully wake up and transition to an Active state in order to receive the high priority information. If such a wakeup flag is detected as false, the broadcast receiver 212 can go back to sleep and remain in the Idle state until a next HPBS 502 occurs and thus conserve battery power.

The state during which the broadcast receiver 212 is checking the HPBS 502 to determine whether a wakeup flag is true or false can be referred to as an Acquisition state, as described in FIG. 1. This is a transient state and is only meant to be occupied by a short period of time by the broadcast receiver 212 while checking of the wakeup flag is true or false. The broadcast receiver 212 is expected to quickly exit the Acquisition state and either move to an Active state or return to the Idle state, depending on whether a wakeup flag is determined to be true or false.

It should be appreciated that the HPBS 502 is small and lightweight and doesn't need to carry a lot of information and therefore may not require a lot of resources to transmit. This is because the main purpose of the HPBS 502 is to notify the broadcast receiver 212 of whether a high priority communication is being transmitted or not so that the broadcast receiver 212 may immediately of back to sleep if no high priority communication is being transmitted. Thus, the HPBS 502 doesn't need to carry any further information beyond this wakeup flag notification.

By using a small number of bootstrap symbols, a negligible amount of transmission resources is occupied by the HPBS 502. In addition, the HPBS 502 are not expected to be transmitted as frequently as are bootstraps 302 of other types of frames. For example, an ATSC 3.0 bootstrap may have a frame length of about 250 ms. Thus, four ATSC 3.0 bootstraps may occur every second. By comparison, the HPBS 502 may have a length of 0.5 ms, for example. Thus, a HPBS 502 may only be transmitted once every several seconds when present.

It should further be appreciated that although the HPBS 502 is illustrated to include 3 symbols, this illustrates one example implementation as will be described. However, the HPBS 502 may include any suitable number of symbols. Thus, as the bootstrap includes an inverted last symbol 504 to indicate the end of the bootstrap 302 and to facilitate extensibility and flexibility, the final symbol 506 of the HPBS 502 may also be inverted to indicate the end of the HPBS 502 and to facilitate extensibility and flexibility of the HPBS 502. In particular, by detecting the inverted symbol 506, the broadcast receiver 212 is able to identify the end of the HPBS 502 and therefore the number of symbols included in the HPBS 502 doesn't need to be predefined.

In one example syntax and semantics implementation, such as an ATSC 3.0 implementation, the ZC root is also used to identify a major version number which identifies a service type to which a bootstrap frame 302 belongs. In addition, a PN seed is indicative of a minor version. The combination of the major/minor version that is used to identify the waveform or type of service can be referred to as a code point, previously described.

It should be appreciated that, although a large number of possible code points may be available, as described, one example implementation of a bootstrap in ATSC 3.0 may only utilize a limited number of code points (i.e. a single ZC root of 137 is used and a PN seed includes one of 8 values). Table 1 illustrates seeds chosen as part of only minor versions in an ATSC 3.0 implementation.

TABLE 1

Example ATSC 3.0 code points

PN Seed: $\tau_{init} = (r_{L-1}, \ldots, r_0)$

| Bootstrap Minor Version | Binary | Hexadecimal |
|---|---|---|
| 0 | 0000 0001 1001 1101 | 0x019D |
| 1 | 0000 0000 1110 1101 | 0x00ED |
| 2 | 0000 0001 1110 1000 | 0x00E8 |
| 3 | 0000 0000 1110 1000 | 0x00E8 |
| 4 | 0000 0000 1111 1011 | 0x00FB |
| 5 | 0000 0000 0010 0001 | 0x0021 |
| 6 | 0000 0000 0101 0100 | 0x0054 |
| 7 | 0000 0000 1110 1100 | 0x00EC |

The remainder of the HPBS 502, following the wakeup flag symbol may include high priority communication and timing, information. In particular, for power efficiency reasons, an Idle broadcast receiver 212 benefits by knowing when the next HPBS 502 notification bootstrap occurs. This allows an Idle broadcast receiver 212 to go back to sleep until just before the next HPBS 502 notification bootstrap is due. At that time point, the Idle broadcast receiver 212 can wake up again and acquire the next HPBS 502 notification bootstrap with a minimum amount of searching, computational expense, and power expenditure.

In one example, a first symbol of the HPBS 502 includes a CAB time-domain structure while the remaining symbols include a BCA time-domain structure, as described in U.S. patent application Ser. No. 15/065,427 and is incorporated herein by reference in its entirety. In one example, the same mechanism of signaling (i.e. cyclic, shifts) and phase inversion of the last signaling symbol is used in HPBS 502 to signal a high priority event, etc. The beginning of major/minor version symbol of the bootstrap 302 begins after the phase inversion in the prepended HPBS 502.

It should be appreciated that the total length or number of symbols in the HPBS 502 notification bootstrap can be scaled to meet future different, requirements for signaling. The syntax, semantics, and the mapping of the signaling information of the HPBS 502 notification bootstrap could be defined specifically for each use case in the future to leverage large number of code points available.

Figure 6:
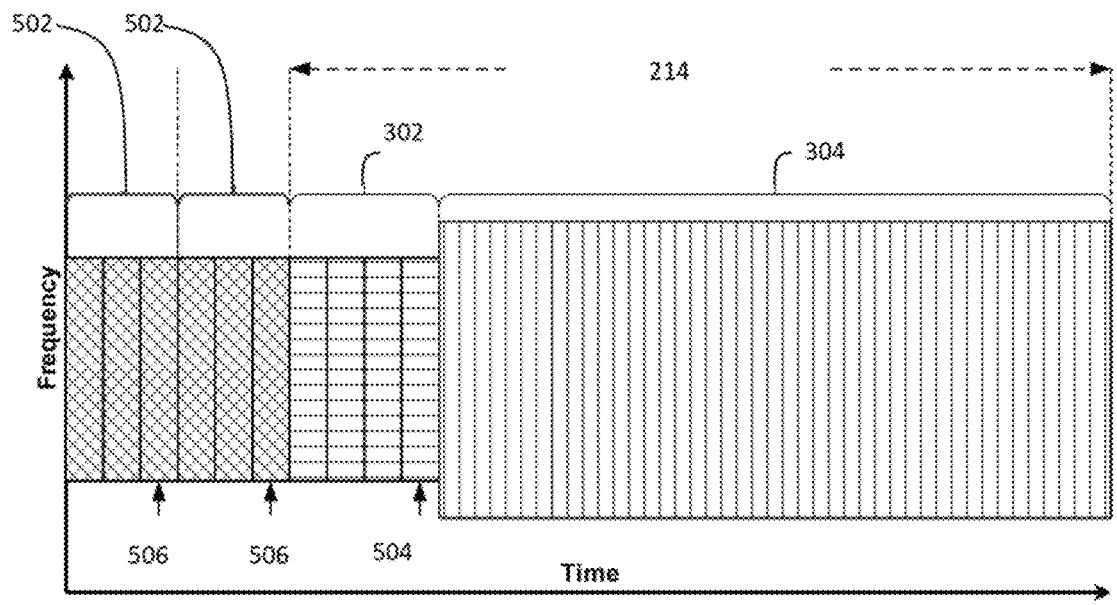
FIG. 6 illustrates an example of concatenating high priority signals.

In one example, as illustrated in FIG. 6, two or more high priority events in broadcast can be indicated by concatenating two or more HPBS 502 notification bootstraps. In one example, the two or more HPBS 502 notification bootstraps may be concatenated in order to provide additional information related to a single high priority event, when a single HPBS 502 notification bootstrap may not be sufficient to convey all the necessary information. In one example, the concatenation may include two different categories of events, such as emergency alert indicated by a public code point and an application software update indicated by a private code point.

To facilitate such timing, a HPBS 502 notification bootstrap therefore signals the minimum time interval until the next occurrence of a HPBS 502 notification bootstrap using HPBS 502 and appropriate syntax and semantics. More symbols may result in more granularity, for example, while less symbols may result in less granularity. The next HPBS 502 notification bootstrap is guaranteed to occur no earlier than this minimum time interval after the current a HPBS 502 notification bootstrap. In one example, the reference time point from which this minimum time interval is measured is the start or end of the current HPBS 502 notification bootstrap. In one example, the reference time point, from which this minimum time interval is measured is some fixed time point (e.g. 1, 2, 3, etc, seconds) later than the current HPBS 502 notification bootstrap. It should be appreciated that the minimum time interval that is signaled should be as close as possible to the actual time interval in order to minimize the amount of searching (and power expenditure) that an Idle broadcast receiver 212 will have to do to find the next HPBS 502 notification bootstrap. It should also be appreciated that it may be desirable to signal a sufficiently long time that is appropriate for a HPBS 502 notification interval. For example, every 100 ins would likely be too frequent for a reasonable HPBS 502 notification interval, whereas every few seconds might represent a more reasonable HPBS 502 notification interval.

Figure 7:
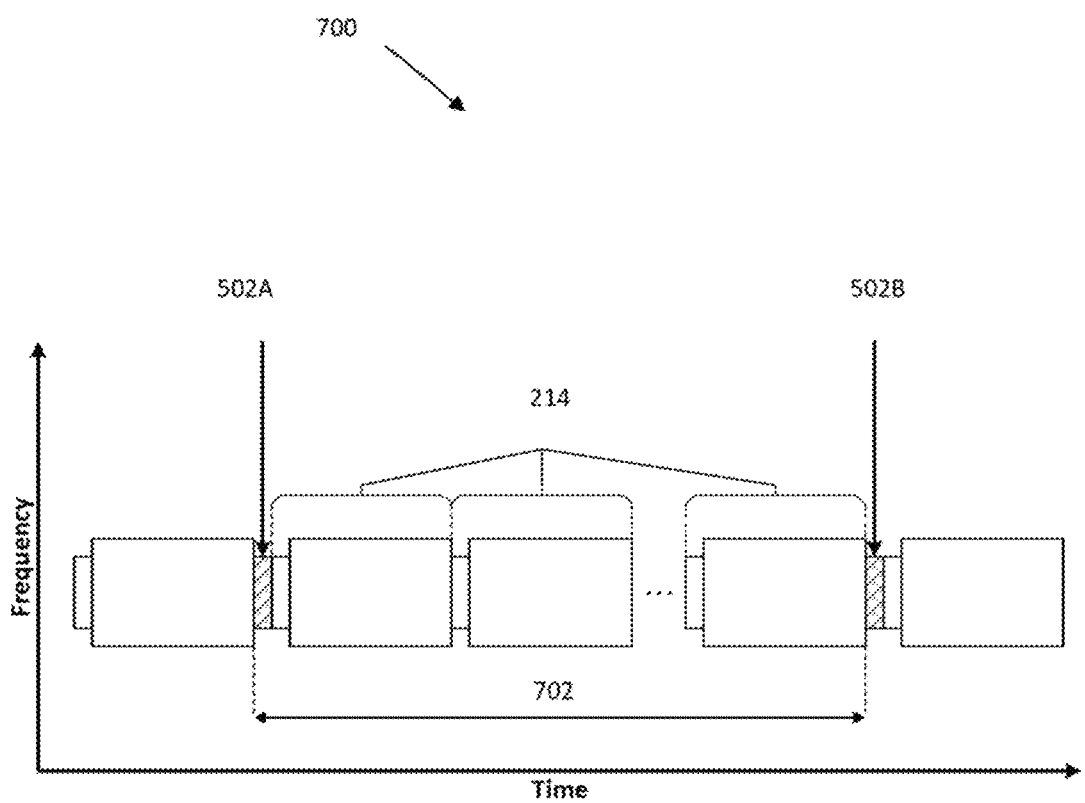
FIG. 7 illustrates an example sequence of frames.

FIG. 7 illustrates a sequence 700 of frames, including both the expected relative occurrence of HPBS 502A and 502B notification bootstraps and other types of regular broadcast signals 214 and the minimum time interval 702 to the next HPBS 502B notification bootstrap that is signaled by the previous HPBS 502A notification bootstrap. As can be seen, the vast majority of frames and transmission resources are dedicated to carrying data such as television programs, movies, etc incorporated in the regular broadcast signals 214. At periodic intervals, a HPBS 502 notification bootstrap is inserted into the transmitted broadcast signal 214 and occupies only a small relative amount of the overall transmission resources. Each HPBS 502 notification bootstrap also signals the minimum time interval to the next or some other future-occurring HPBS 502 notification bootstrap, so that Idle state broadcast receivers 212 can save power by skipping over all of the intervening data frames.

It should be appreciated that the signaled minimum time interval 702 to the next (or some other future-occurring) HPBS 502 notification bootstrap may vary from one HPBS 502 notification bootstrap to the next, depending on the total lengths of the data frames that are to be transmitted between adjacent HPBS 502 notification bootstraps. That is, the minimum time interval 702 to the next HPBS 502 notification bootstrap is not constrained to be a constant value but is instead flexible and therefore extensible.

In one embodiment, the payload length of a frame occurring immediately before or immediately after an HPBS 502 notification bootstrap is reduced by the time length of the HPBS 502 notification bootstrap so that the frame start boundaries continue to occur at regular periodic intervals regardless of whether or not a HPBS 502 notification bootstrap is present. This ensures that regular frame timing is not affected by HPBS 502 notification bootstraps.

In one example, the HPBS 502 may include 3 bootstrap symbols. The first symbol may identify that a HPBS 502 notification bootstrap occurs and facilitates initial time synchronization by a receiver. The second and third symbols might each carry eight signaling bits, one of which is used for the HPBS 502 wake up flag. The remaining fifteen signaling bits may indicate the minimum time interval until the next HPBS 502 notification bootstrap. For example, fifteen signaling bits can signal values from 0 to 32767.

Thus, if the signaling granularity is 0.5 ms, then a maximum time interval of 16383.5 ms (or about 16.4 seconds) can be signaled. If the signaling granularity is 0.25 ms, then a maximum time interval of 8191.75 ms (or about 8.2 seconds) can be signaled. With such levels of granularity, the time interval until the next HPBS 502 notification bootstrap can be signaled very accurately, and thus Idle state broadcast receivers 212 will expend very little additional power when searching for the next HPBS 502 notification bootstrap. It should be appreciated that the number of signaling, bits used for this time interval indication could be reduced slightly (i.e. to 14) in order to free up one or more reserved bits for possible future use.

In one example, the HPBS 502 notification bootstrap might consist of only two bootstrap symbols. In this configuration, only seven signaling bits might be available for signaling the minimum time interval until the next HPBS 502 notification bootstrap. This might require a coarser time granularity to be used. It should be appreciated that this may be a tradeoff as adding more symbols can be used to increase granularity.

As previously disclosed in U.S. patent application Ser. No. 14/092,993, it should be appreciated that, in order to facilitate timed delivery of content of the broadcast network, a Coordinated Universal Time (hereinafter referred to as "UTC") reference clock will be established at each client or broadcast receiver 212 by using the broadcast physical layer to carry UTC information. These UTC time stamps are calibrated to the emission point or air interface of the transmitting antenna(s), and the only time inaccuracy that would be introduced would be the propagation time of the calibrated UTC time stamps to a receiver. The UTC reference time is also used when encoding content at a transmitter and for the decoding and presentation of timed content at a receiver by establishing a timing and buffer model based on the UTC reference.

Figure 8:
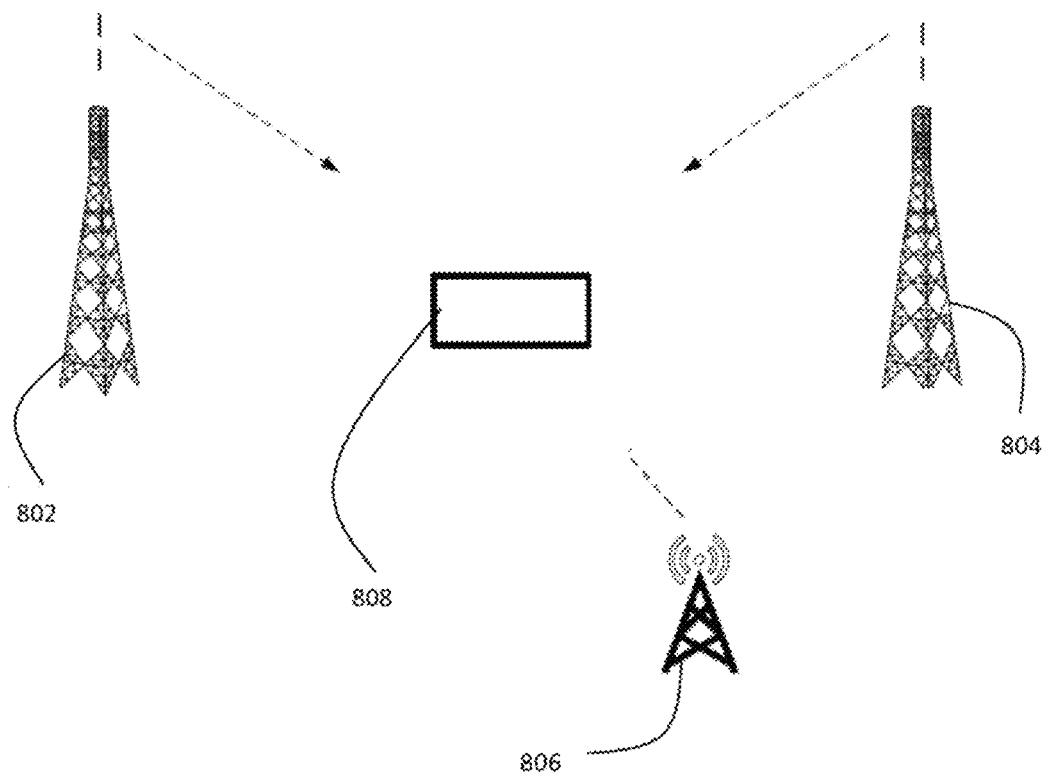
FIG. 8 illustrates an example broadcast network communication system.

As illustrated in FIG. 8, first and second heterogeneous networks (hereinafter referred to as "HetNet") 802 and 804 with a common broadcast Radio Access Technology (hereinafter referred to as "RAT"), a third HetNet 806 a different RAT such as LTE-A, can be used to improve the consumer experience through timed delivery content based on a UTC global reference time at receiver 808.

It should be appreciated that the definition of a physical layer frame is the sum of the bootstrap+payload. Ideally for HetNets, this frame length should be fixed to some integer number of milliseconds (e.g. 250 ms, 500 ms, 1000 ms, etc). As illustrated in FIG. 8, clients establish UTC references via the broadcast physical layer. The third HetNet 806, for example, may have a fixed frame length of 10 ins and may have the start of a frame phased to the air interface to support coordination among First and second HetNets 802 and 804. Thus, maintaining a fixed frame length and a common UTC reference 808 can enable interoperability across these two different RATs.

However, it should be appreciated that there may be a potential problem with extending the length of a bootstrap while not compensating the payload length of the corresponding frame in order to keep the total frame length constant. This may complicate interoperability between broadcast 802 and LTE-A 806, for example, and between several broadcasters 804 and 804 using the same RAT. The UTC time stamps in a broadcast signal can remain calibrated at the air interface (i.e. the reference time point is the start of each frame) and continue to deliver accurate UTC information as frame lengths vary between stations using HPBS 502 at different cadences and in different ways. The problem is that when frame lengths vary between stations by using HPBS 502, the relative start of each frame (as represented by the bootstrap) may drift continuously between different stations.

To begin receiving any broadcast content, however, a receiver must find the bootstrap (i.e. entry point of a frame) to receive critical low-level signaling information. But if this entry point start of frame is drifting in time continuously between two cooperating stations, the interoperability will be complicated. Therefore, in one example, the time length of a frame is held constant by adjusting the number of payload symbols and/or payload symbol lengths used in a frame when HPBS 502 are used and interoperability is a concern. This time-drifting of a start of a frame may add several hundreds of microseconds delay or more between content broadcast on cooperating stations that must be compensated for in a seamless handover, or to enable other timed service enhancements or interoperability to other RATs such as LTE-A.

It should be appreciated that HPBS 502 notification bootstrap concept can be implemented to facilitate the signaling of various event notifications that may need to be provided to either Idle or Active state broadcast receivers 212. For example, an Idle state broadcast receiver 212 may want to receiver weather forecasts or software updates in the background, and notification signaling within an HPBS 502 notification bootstrap could be used to inform an idle state broadcast receiver 212 that such data is about to be transmitted in the main broadcast stream and that the broadcast receiver 212 should therefore wake up and receive the desired data. Thus, the HPBS 592 bootstrap may contain multiple signaling bits in order to indicate the positive or negative status of specific events, with at least one signaling bit being associated with each event. Additional signaling bits would be used to provide information about the time occurrence of the next or some other future notification bootstrap.

Figure 9:
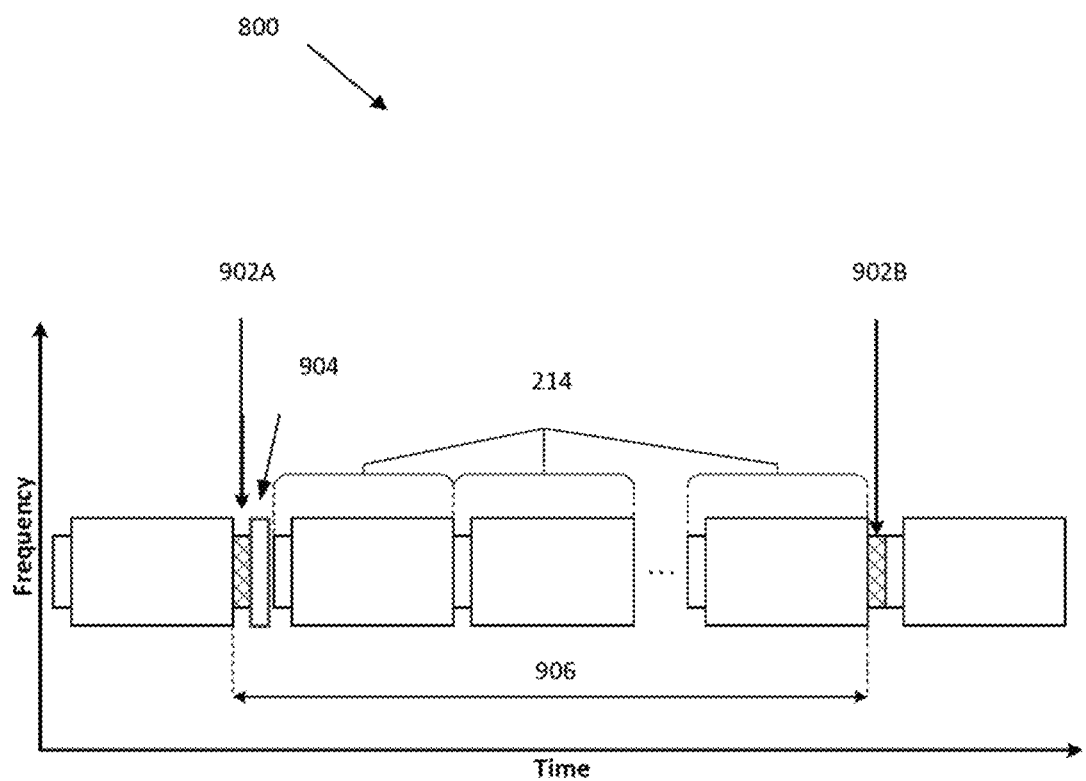
FIG. 9 illustrates an example sequence of frames.

For example, as illustrated in FIG. 9, a private HPBS 902A notification bootstrap can be followed by a private payload 904. The private payload 904 can be any suitable high priority payload such as broadcast data associated with HTML5 application content or broadcaster news, and weather updates, etc. as some possible examples. Following the first private HPBS 902A, the sequence of frames 900 will continue with regular broadcast signals 214 for a minimum time interval 906, defined by the first private HPBS 902A, until the next private HPBS 902B notification bootstrap. The private data is seen associated with only 902A which would indicate by signaling the availability of this private data which would then be consumed by entering active state then transition back to idle state quickly.

It should be appreciated that high priority bootstrap signals may be either public or private. For example, a code point may be designated as public, meaning that the code point has been designated as one which can be used by anyone for a specific purpose, such as transmitting emergency alerts. Therefore, associated high priority bootstrap signals transmitted using that code point may reach many types of devices that have been configured to identify and interpret the given code point. On the other hand, a code point that is designated as private may be reserved for broadcaster's business models for transmitting to a specific type of content to a limited audience or new types of devices. It should further be appreciated that high priority bootstrap signals, whether public or private, may or may not be followed by a post bootstrap payload. Whether a payload follows may be indicated, for example, in the signaling portion of the high priority bootstrap signals.

Figure 10:
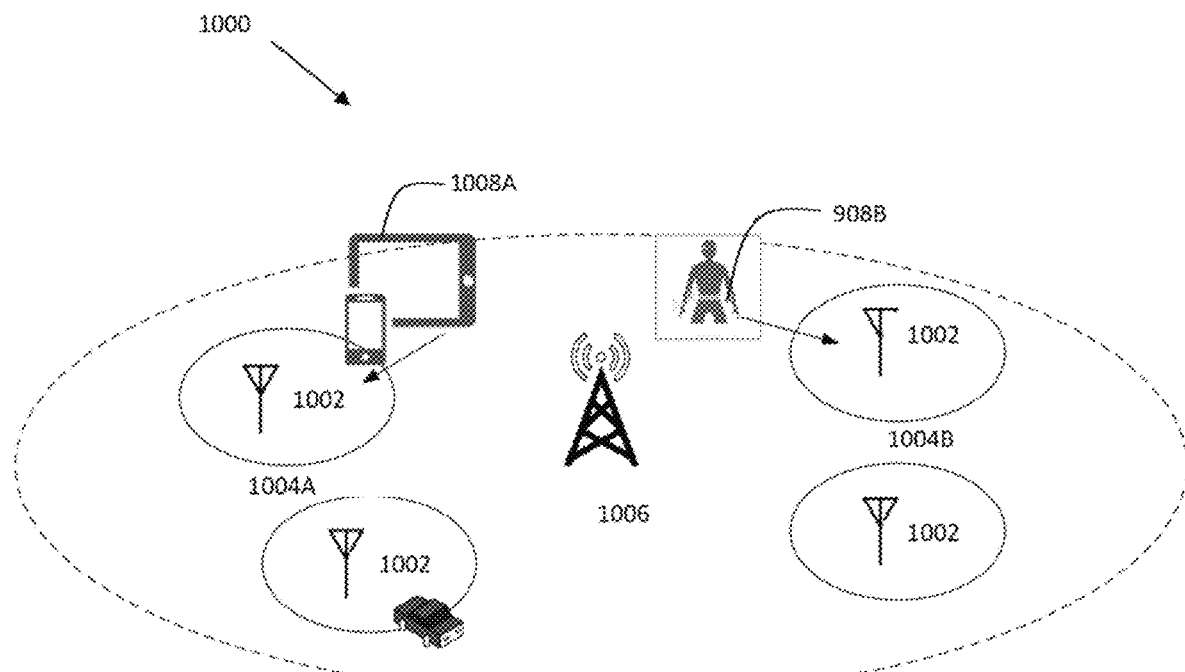
FIG. 10 illustrates an example high priority signal use case.

In one example, as illustrated in FIG. 10, high priority bootstrap signals may be used for targeted hyperlocal advertising data 1000 using beacons 1002. Such beacons may be used to deliver targeted content or to specific hyper local geographic areas or zones of beacons 1004 within a broadcast coverage area 1006. For example, high priority bootstrap symbols may be defined to alert devices 1008 within specific hyper local zones 1004 of specific content availability. Thus, a first device 1008A may detect and consume content delivered to a first hyper local zone 1004A using a specific code point while a second device 1008B in a second hyper local zone 1004B may detect and consume content delivered both within larger coverage area 1006.

Figure 11:
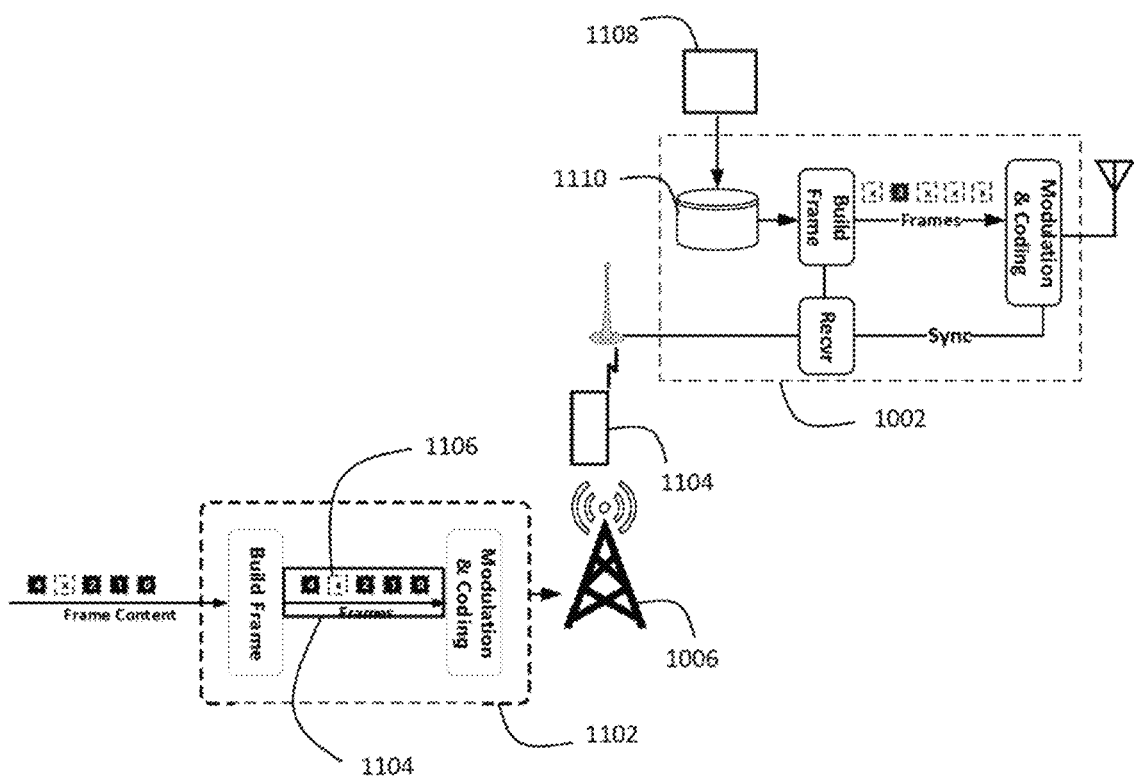
FIG. 11 illustrates, in more detail, an example high priority signal use case.

FIG. 11 illustrates in more detail, the physics that make this hyperlocal reception possible. The main host broadcast station 1102 providing the large broadcast coverage area 1006, described in FIG. 10 is shown. The beacon 1002 is shown synchronizing to a received signal 1104 in the broadcast coverage area 1006, including the availability of blank frames 1104 indicating opportunity for synchronized beacons to transmit content. Third party content 1108 party is stored or cached in advance in data store 1108. When the time arrives, which is signaled over the air via the broadcast coverage area 1006, the local stored frame of data 1108 is transmitted. It should be appreciated that this tight synchronization enables this transmission to occur without interference to receiver device 1008. The host transmitter or broadcast station 1102 can be part of a larger synchronized network of host transmitters such as in single frequency networks (SFN), for example. It should be appreciated that there can be an unlimited number of beacons 1002 so long as their coverage areas 1004 don't overlap.

Figure 12:
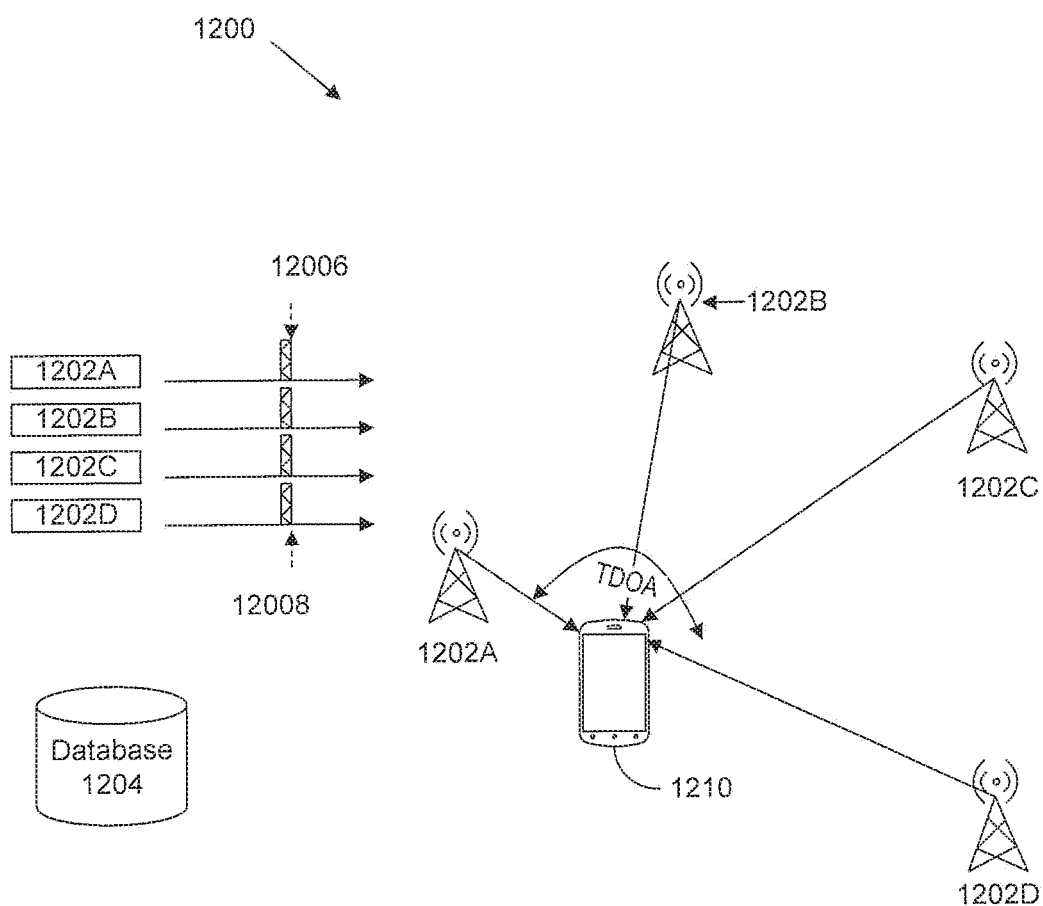
FIG. 12 illustrates an example high priority signal use case.

In one example, as illustrated in FIG. 12, a single high priority bootstrap symbol 1206 may be used for a terrestrial positioning system 1200 to support local services based on geographic location of receiver and as a unique transmitter identification use case. The transmitter identification is useful for in service monitoring of SFN, etc. As previously disclosed in U.S. patent application Ser. No. 14/092,993, UTC time stamps in frames are calibrated to the emission point air interface 1208 of the transmitting antenna(s) of all transmitters 1202A, 1202B, 1202C, and 1200D (hereinafter referred to as transmitters 1202) and the only time inaccuracy introduced at receiver would be the propagation time of the calibrated UTC time stamps to a receiver. All the single HPBS 1206 are shown being in time alignment and released at all air interfaces 1208 of all transmitters 1202 at the same instant. An admin database 1204 assigns each station 1202 a unique code point for HPBS. Thus, for each of the four transmitters 1202 illustrated in the example, each code point is unique for each emitted HPBS. It is assumed that the receiver 1210 has knowledge of this database 1204, something that won't change often. Associated in the database 1204 with each code point is information such as the transmitter's 1202 name, geographic Latitude/Longitude, antenna height, etc. A receiver 1210 is able to identify each code point it receives and the time distance of arrival ("TDOA") of signals. Applying this information about the identified code points and the TDOA in combination with knowledge from the database 1204, software on the receiver 1210 can calculate its location in a straight forward manner. It should be appreciated that such a terrestrial positioning system 1202 may have some advantages over GPS as a result of the propagation and indoor penetration of broadcast signal and the fixed location of each transmitter i.e. not from orbital satellites. This system can support location based services that a broadcaster may offer, for example. This system 1200 may also enable a broadcaster to send public alerts in times of emergency using a geo-fence. In addition, receiving a code point will enable a transmitter 1202 to be uniquely identified. The system 1202 may also be useful for monitoring in SFN or for interference investigation, so long as the station 1202 appears in the database 1204. It should be appreciated that these examples can be viewed as efficient operation methods since only one HPBS is consumed for these use cases.

Figure 13:
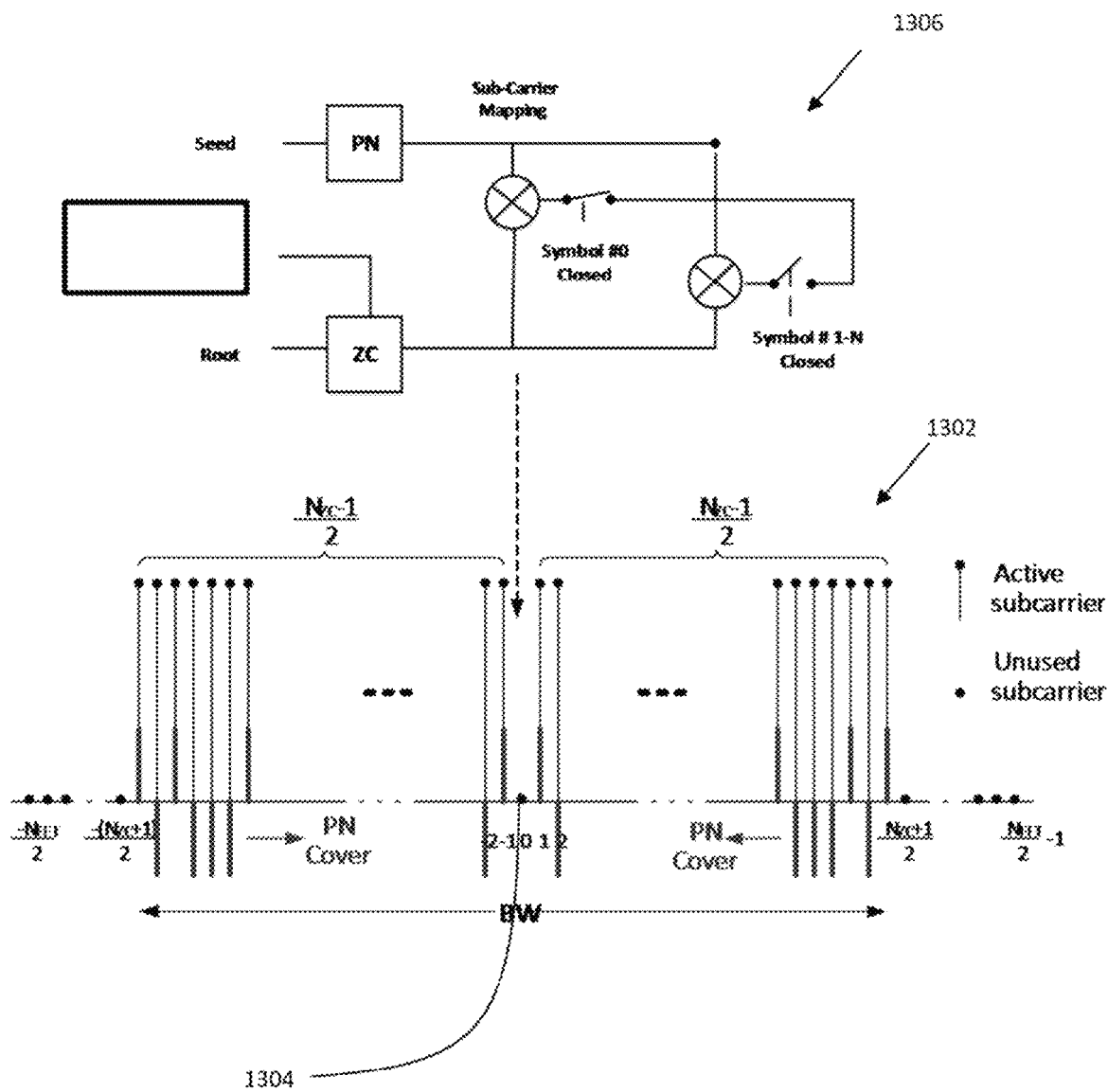
FIG. 13 illustrates an example system for generating a bootstrap.

In one example, as illustrated in FIG. 13, to increase the efficiency, the frequency domain structure of the first HPBS is modified to carry optional 1 bit of signaling. In particular, as illustrated in FIG. 13, subcarriers 1302 of the first bootstrap symbol 1304 use the conjugate of the ZC sequence to indicate an event is true. The normal ZC sequence indicates and event is false. The application (syntax and semantics) is left to the use case.

Returning FIG. 12 and use case of a terrestrial positioning system to support local services based on geographic location of receiver and as a unique transmitter identification with single HPBS. The single HPBS could also be modulated with 1 bit signaling. An example may be to indicate EAS is active or not. Three use cases from one symbol may be seen as even more efficient as an option.

It should be appreciated that there may be a potential risk fir on air collisions when multiple broadcasters attempt to simultaneously use the same code point for different purposes. For example, a receiver may experience confusion when an urgent weather or news update is broadcast using a code point that is believed to be reserved for only emergency alerts. As described in an example ATSC 3.0 implementation, there may only be 8 possible code points utilized. Thus, such collisions may not be a concern in such a discrete application. However, there are actually a large number of potential code points (i.e. around 98 million) that can be defined as being indicative of high priority communications. Thus, there may be a need to manage the code space and use of the code points in order to prevent such collisions and enable future extensibility. In particular, there may be a need to manage designation and allocation of code points to ensure that different broadcasters don't interfere with one another's broadcast. For example, it is envisioned that a management entity, possibly similar to the type of management entity that manages the allocation of Internet IP addresses, may exist to manage the allocation of code points.

Such a code point management entity may be tasked with designating code points into different categories. For example, a certain range of code points may be designated for public use while other code points may be designated for private use. In one example, groups of code points may be designated for representing types of waveforms and types or services. In one example, groups of code points may be designated for use with certain specific types of devices such as IoT or wearables. In one example, code points may be designated based on regions. For example, a first range of code points may be designated for use in a first region while a second range of code points may be designated for use in a second region. In one example, the same range of code points may be assigned multiple times in different regions, as long as the regions do not overlap within physical broadcast range so as to avoid potential interference and collision.

In one example, the use of code points may be authorized by the management entity. Thus, a broadcaster requiring use of code points may be required to make a request for such code points and only be authorized to broadcast using the code points within a designated range granted through a license.

Figure 14:
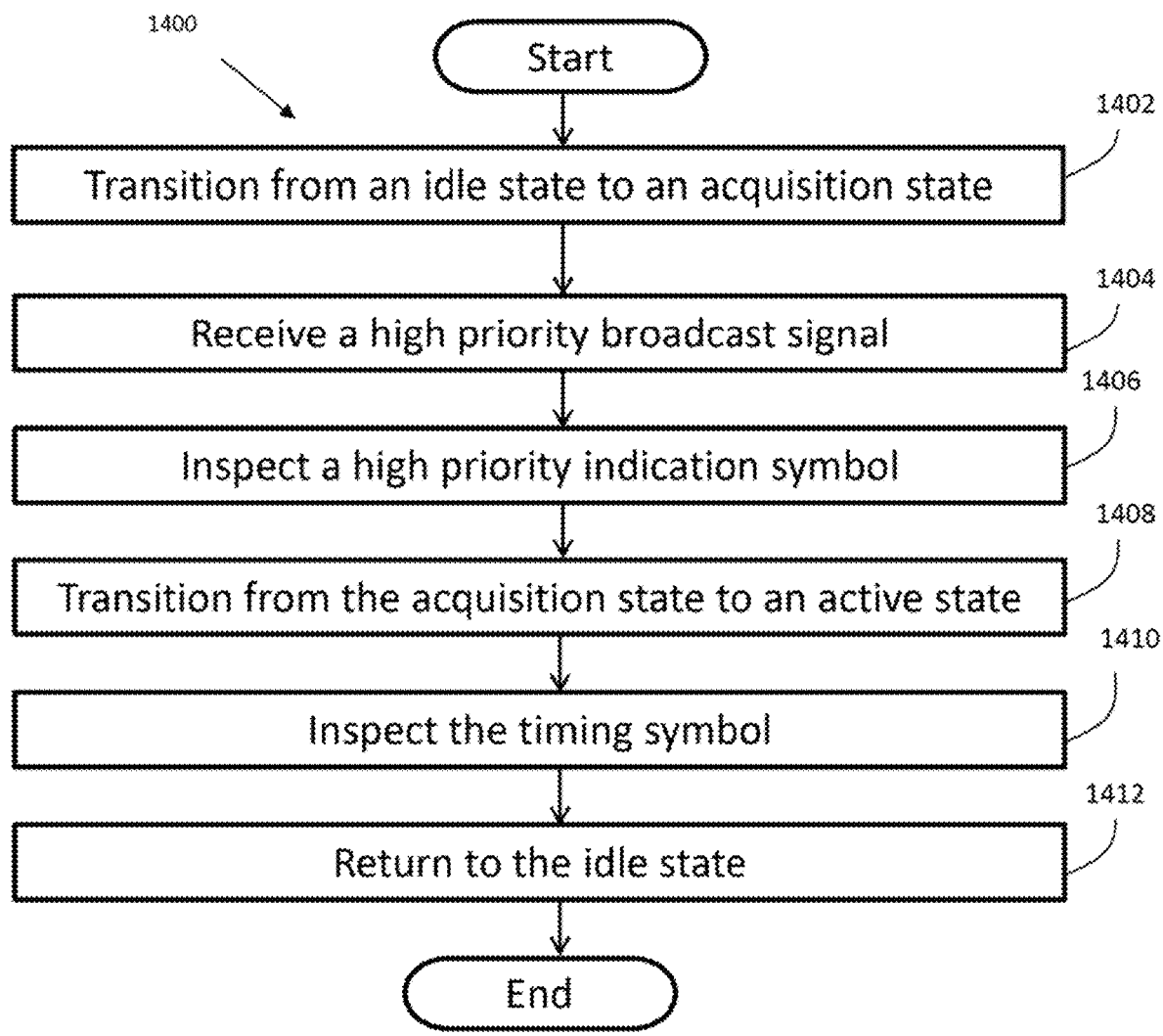
FIG. 14 illustrates an example method for consuming high priority content at a battery-powered device.

FIG. 14 illustrates an example method for consuming high priority content at a battery-powered device while conserving battery power. At step 1402, the battery-powered device transitions from an idle state to an acquisition state. At step 1404, the battery-powered device receives a high priority broadcast signal comprising a high priority identifying symbol, a high priority indication symbol, and a timing symbol. At step 1406, the battery-powered device, upon successfully decoding the high priority symbol identifier, inspects the high priority indication symbol to determine whether high priority content is present. At step 1408, the battery-powered device transitions from the acquisition state to an active state to consume the high priority content responsive to determining that high priority content is present. At step 1410, the battery-powered device inspects the timing symbol to determine the minimum time until the next expected high priority broadcast signal. At step 1410, the battery-powered device returns to the idle state until the minimum time has expired.

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described, herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed:

1. A method for notifying a battery-powered device of a presence of high priority broadcast content while enabling the device to conserve battery power, comprising:
  generating a high priority broadcast signal, the high priority broadcast signal comprising:
    a high priority symbol identifier for informing the battery-powered device to switch from an idle state to an acquisition state to inspect a remainder of the high priority broadcast signal, wherein the acquisition state is a transient state between the idle state and an active state,
    a high priority indication symbol for informing the battery-powered device to transition to the active state from the acquisition state to receive high priority broadcast content before returning to the idle state; and
    a timing symbol including a minimum time period until a next high priority broadcast signal, enabling the battery-powered device to remain in the idle state until the next high priority broadcast signal; and
  broadcasting the high priority broadcast signal to the battery-powered device.

2. The method of claim 1, wherein the generating the high priority broadcast signal comprises generating the high priority symbol identifier by modulating a zadoff-chu sequence, generated using a zadoff-chu sequence root value, with a pseudo noise sequence, generated using a pseudo noise sequence seed value.

3. The method of claim 1, wherein the battery-powered device comprises a solar-powered device.

4. The method of claim 1, wherein the generating the high priority broadcast signal is based on predefined syntax and semantics capable of being identified by the battery-powered device.

5. The method of claim 1, wherein the high priority symbol identifier is a public identifier.

6. The method of claim 1, wherein the high priority symbol identifier is a private identifier.

7. The method of claim 1, further comprising:
appending a post-signal waveform to the high priority broadcast signal.

8. The method of claim 1, wherein the high priority symbol identifier is indicative of one of an emergency alert, application specific content, hyperlocal targeting information, and geo-positioning information.

9. The method of claim 1, further comprising:
concatenating a plurality of high priority broadcast signals.

10. A method for consuming high priority content at a battery-powered device while conserving battery power, comprising:
transitioning from an idle state to an acquisition state, wherein the acquisition state is a transient state between the idle state and an active state;
receiving a high priority broadcast signal comprising a high priority identifying symbol, a high priority indication symbol, and a timing symbol, wherein the timing symbol includes a minimum time period until a next expected high priority broadcast signal;
upon successfully decoding the high priority identifying symbol, inspecting the high priority indication symbol to determine whether high priority content is present;
transitioning from the acquisition state to the active state to consume the high priority content in response to determining that high priority content is present;
inspecting the timing symbol to determine the minimum time period until the next expected high priority broadcast signal; and
returning to the idle state until the minimum time period until the next expected high priority broadcast signal has expired.

11. The method of claim 10, further comprising transitioning back to the idle state from the acquisition state upon unsuccessfully decoding the high priority symbol identifier.

12. The method of claim 10, wherein the high priority symbol identifier is a public identifier.

13. The method of claim 10, wherein the high priority symbol identifier is a private identifier.

14. The method of claim 10, wherein the high priority identifying symbol is indicative of one of an emergency alert, application specific content, hyperlocal targeting information, and geo-positioning information.

15. The method of claim 10, wherein a reference time point from which the minimum time period until the next expected high priority broadcast signal is measured is a start of the received high priority broadcast signal.

16. The method of claim 10, wherein a reference time point from which the minimum time period until the next expected high priority broadcast signal is measured is an end of the received high priority broadcast signal.

17. The method of claim 10, wherein a reference time point from which the minimum time period until the next expected high priority broadcast signal is measured is a fixed time point after the received high priority broadcast signal.

18. A battery-powered device, comprising:
a memory that stores instructions; and
a processor, upon executing the instructions, configured to:
transition the battery-powered device from an idle state to an acquisition state, wherein the acquisition state is a transient state between the idle state and an active state;
receive a high priority broadcast signal comprising a high priority identifying symbol, a high priority indication symbol, and a timing symbol, wherein the timing symbol includes a minimum time period until a next expected high priority broadcast signal;
upon successfully decoding the high priority identifying symbol, inspect the high priority indication symbol to determine whether high priority content is present;
transition the battery-powered device from the acquisition state to the active state to consume the high priority content in response to determining that high priority content is present;
inspect the timing symbol to determine the minimum time period until the next expected high priority broadcast signal; and
return the battery-powered device to the idle state until the minimum time period until the next expected high priority broadcast signal has expired.

19. The battery-powered device of claim 18, wherein the processor, upon executing the instructions, is further configured to transition the battery-powered device back to the idle state from the acquisition state upon unsuccessfully decoding the high priority symbol identifier.

* * * * *

UNITED STATES PATENT AND TRADEMARK OFFICE
CERTIFICATE OF CORRECTION

PATENT NO. : 10,568,026 B2
APPLICATION NO. : 15/079345
DATED : February 18, 2020
INVENTOR(S) : Simon et al.

Page 1 of 1

It is certified that error appears in the above-identified patent and that said Letters Patent is hereby corrected as shown below:

In the Specification

In Column 13, Lines 35-36, replace "a single high priority bootstrap symbol 1206" with -- a single high priority bootstrap symbol 12006 --.

In Column 13, Lines 42-43, replace "emission point air interface 1208" with -- emission point air interface 12008 --.

In Column 13, Lines 47-48, replace "All the single HPBS 1206" with -- All the single HPBS 12006 --.

In Column 13, Lines 48-49, replace "released at all air interfaces 1208" with -- released at all air interfaces 12008 --.

Signed and Sealed this
Twenty-fourth Day of March, 2020

Andrei Iancu
*Director of the United States Patent and Trademark Office*